United States Patent
Andersen

(10) Patent No.: US 6,662,836 B1
(45) Date of Patent: Dec. 16, 2003

(54) TREE SHEAR

(76) Inventor: Eugene C. Andersen, 395 E. Central Rd., Lamar, MO (US) 64759

( * ) Notice: Subject to any disclaimer, the term of this patent is extended or adjusted under 35 U.S.C. 154(b) by 0 days.

(21) Appl. No.: 10/154,339

(22) Filed: May 23, 2002

(51) Int. Cl.$^7$ .............................................. A01G 23/08
(52) U.S. Cl. ........................ 144/34.5; 30/134; 30/267; 144/339; 144/4.1
(58) Field of Search ........................ 30/134, 228, 231, 30/266, 267, 180; 144/4.1, 34.1, 34.5, 335, 336, 339, 24.13

(56) References Cited

U.S. PATENT DOCUMENTS

| | | | |
|---|---|---|---|
| 3,294,131 A | | 12/1966 | Larson |
| 3,498,350 A | * | 3/1970 | Maradyn .................... 144/34.5 |
| 3,613,752 A | | 10/1971 | Davis |
| 3,646,975 A | * | 3/1972 | McNeil, Sr., et al. ...... 144/34.5 |
| 3,746,064 A | * | 7/1973 | Blackburn .................. 144/339 |
| 3,886,984 A | * | 6/1975 | Engel ......................... 144/339 |
| 4,046,179 A | | 9/1977 | Crawford |
| 4,326,571 A | | 4/1982 | Crawford |
| 4,407,343 A | * | 10/1983 | Brown ........................ 144/339 |
| 4,536,976 A | | 8/1985 | Holopainen |
| 4,541,177 A | | 9/1985 | Hollander |
| 4,616,417 A | | 10/1986 | Gross |
| 5,142,779 A | | 9/1992 | LaBounty |
| 6,061,911 A | | 5/2000 | LaBounty et al. |

* cited by examiner

*Primary Examiner*—W. Donald Bray
(74) *Attorney, Agent, or Firm*—Hovey Williams LLP

(57) ABSTRACT

A tree shear attachment is, in one preferred embodiment, designed to replace the shovel at the outermost end of the boom assembly of a backhoe to provide remarkable maneuverability and an extensive range of motion for the shear. One of the severing jaws is fixed, presenting a stationary anvil, while the other is moveable and is provided with a shear blade that moves into engagement with the stationary anvil to complete the severance. Retainers at the forwardmost ends of the jaws help grip and stabilize the butt end of the tree following severance. An upstanding stabilizing rack on the frame of the shear has a pair of laterally spaced, forwardly projecting arms that generally overlie the two jaws to embrace and stabilize upper portions of the tree during and after severance.

20 Claims, 5 Drawing Sheets

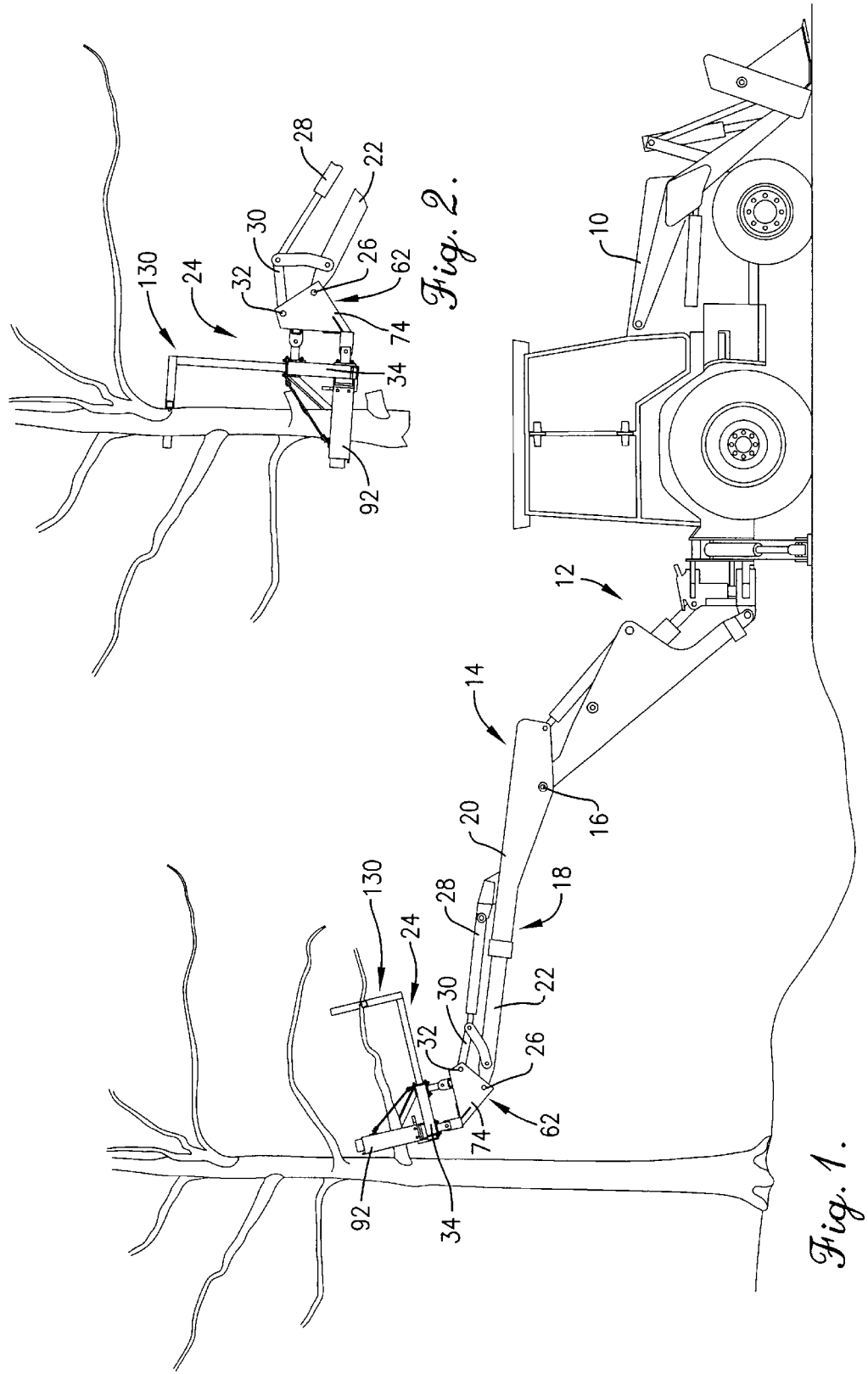

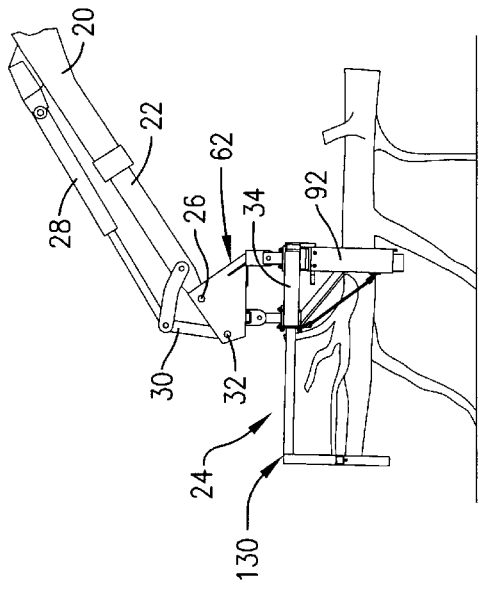
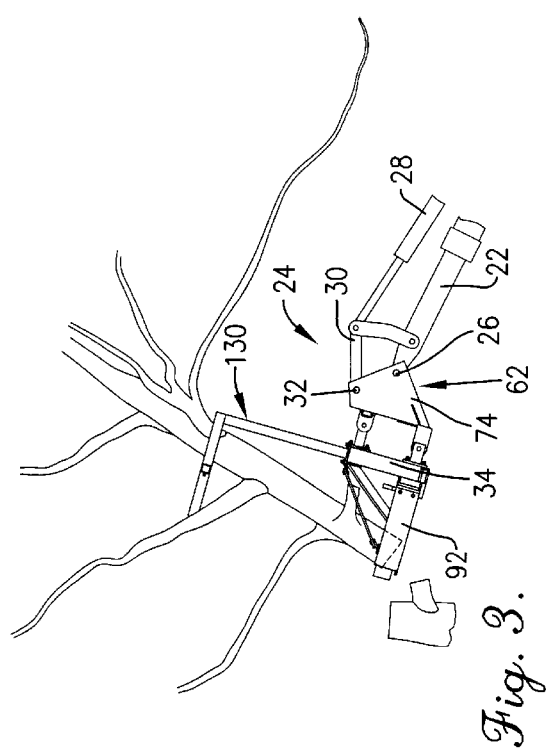
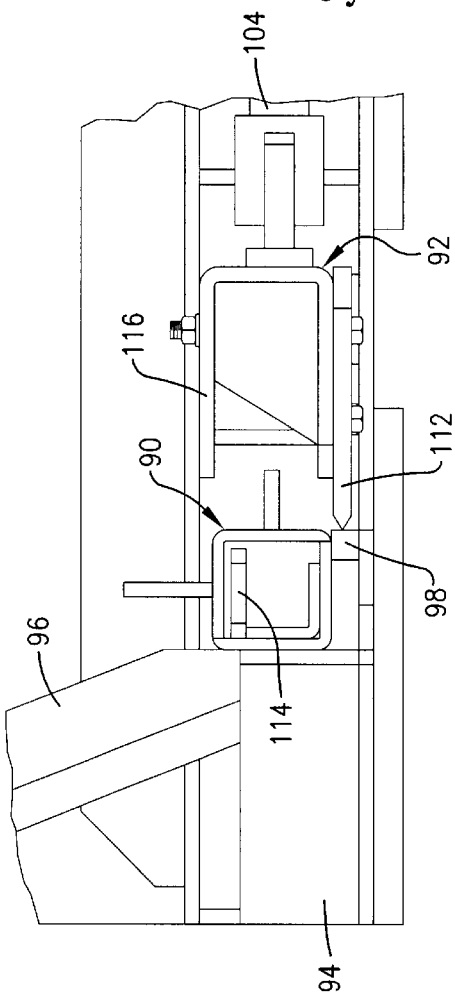

TREE SHEAR

TECHNICAL FIELD

The present invention relates to implements for attachment to mobile work vehicles and, more particularly, to a tree shear attachment having particular utility as a substitute for the digging bucket on a backhoe so as to provide a shear having a remarkably high degree of maneuverability and range of motion.

BACKGROUND

Various tree shear attachments are presently available for skid steer and front end loaders and tractors to permit an operator to remove brush and small trees along roadsides and other areas. However, for the most part, such attachments are designed for mounting on three point hitches or front end lift arms associated with such vehicles, thus limiting their range of motion. Moreover, many current commercially available shears have reliability problems and do not provide satisfactory means for safely and securely handling severed portions of the tree during the shearing action and immediately thereafter.

SUMMARY OF THE INVENTION

The present invention provides a tree shear attachment having particular, but not exclusive, utility as a substitute for the bucket of a backhoe so that an extremely broad range of motion is obtained for the shear, allowing it to be cocked and manipulated into a multitude of different positions most suited for handling the shearing job confronting the operator. A sturdy base frame of the shear is attached to the outer end of the boom assembly of the backhoe and can be rocked back and tipped forward through an extensive arc about a transverse axis to most advantageously position shearing jaws projecting forwardly from the frame, while the extendable nature of the boom assembly and its articulated design, as well as its ability to swing from side-to-side, contribute to extreme flexibility in terms of positioning and operating the shear. The shearing jaws lie in a horizontal plane that is offset below the transverse plane of the pivot axis of the shear so that the jaws can be brought down very close to the ground at the base of the tree to leave a minimal stump, such offset also facilitating further positioning and trimming of the tree once it has been felled.

In a preferred embodiment, the shear utilizes one fixed jaw and one moveable jaw, the fixed jaw being provided with a forwardly extending anvil while the moveable jaw has a sturdy shear blade that is brought into shearing engagement with an anvil during operation. At the front ends of the jaws, special retainers grip and hold the butt end of the tree following severance to assist in stabilizing and controlling the severed portion. Additionally, an overhead stabilizing rack mounted on the base frame has a pair of laterally spaced, forwardly extending stabilizing arms overlying the respective jaws to confine and stabilize the severed tree. The arm above the stationary jaw has an inturned forward portion so as to present a generally concave receiving nook that faces and is opposed to the moveable jaw. During severance, the moving jaw tends to push the upper extremities of the tree into the nook where it is cradled by the inturned arm. The other stabilizing arm is preferably straight but is provided with a laterally inwardly extending projection at its forwardmost end that helps engage and stabilize limbs of the severed tree. Preferably, the hydraulic operating cylinder for the moveable jaw is housed within a protective housing that shields the cylinder from damage during operation and use.

BRIEF DESCRIPTION OF THE DRAWINGS

FIG. 1 is a side elevational view of one suggested use of a tree shear in accordance with the principles of the present invention, the figure showing the shear attached to the boom assembly of a backhoe that is in turn mounted on the rear of a work vehicle;

FIG. 2 is a slightly enlarged, fragmentary elevational view of the shear positioned for severing the top portion of a standing tree;

FIG. 3 is a fragmentary side elevational view similar to FIG. 2, but illustrating the way the severed portion of the tree is retained and cradled by the shear following severance;

FIG. 4 is a fragmentary side elevational view illustrating the way in which the shear may be used to cut up the fallen tree into shorter lengths;

FIG. 10 is a somewhat enlarged fragmentary front elevational view of the shear with the jaws closed and taken substantially along sight line 10—10 of FIG. 8.

DETAILED DESCRIPTION

Figure 5:
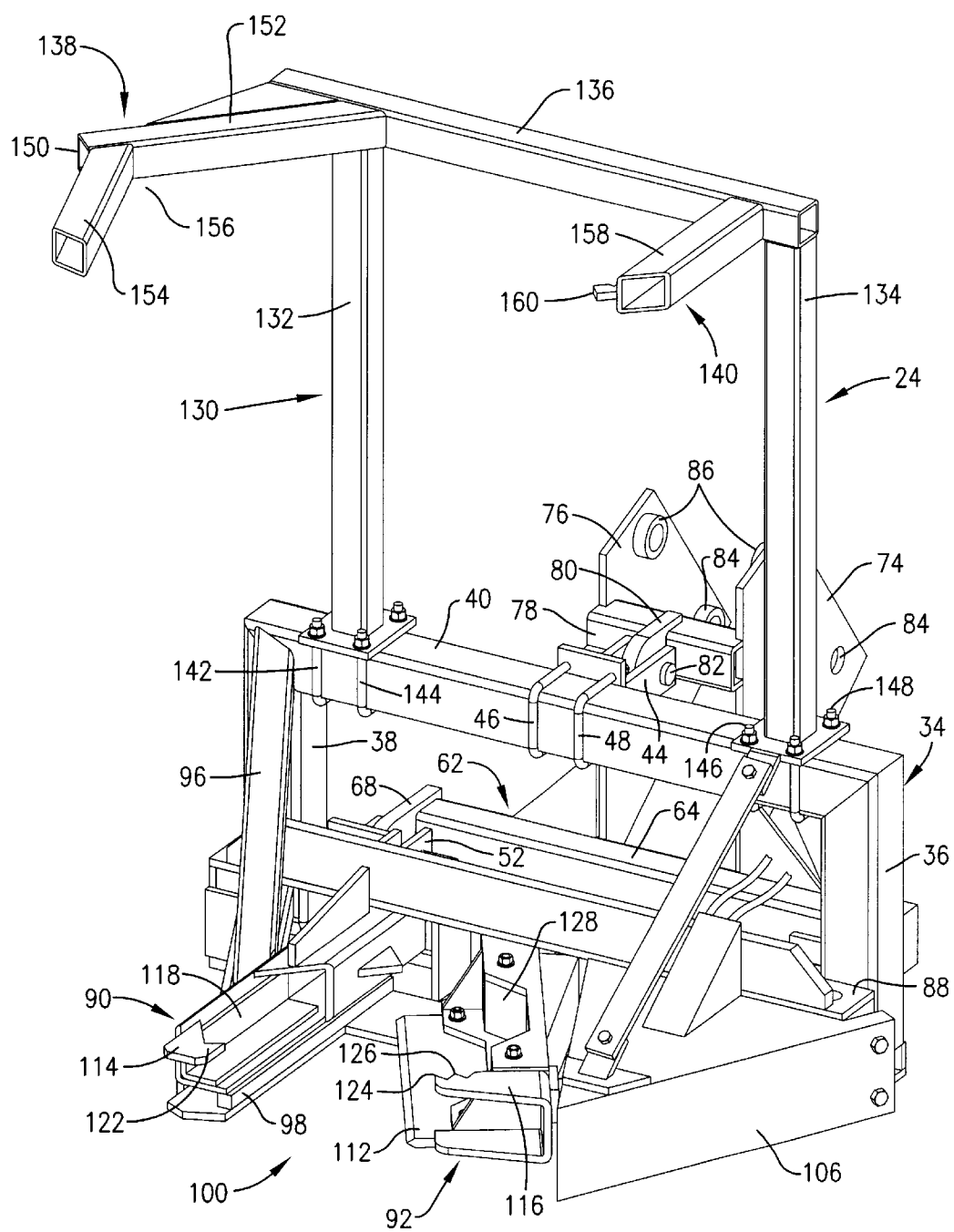
FIG. 5 is a left front isometric view of the shear with the jaws open.
Figure 6:
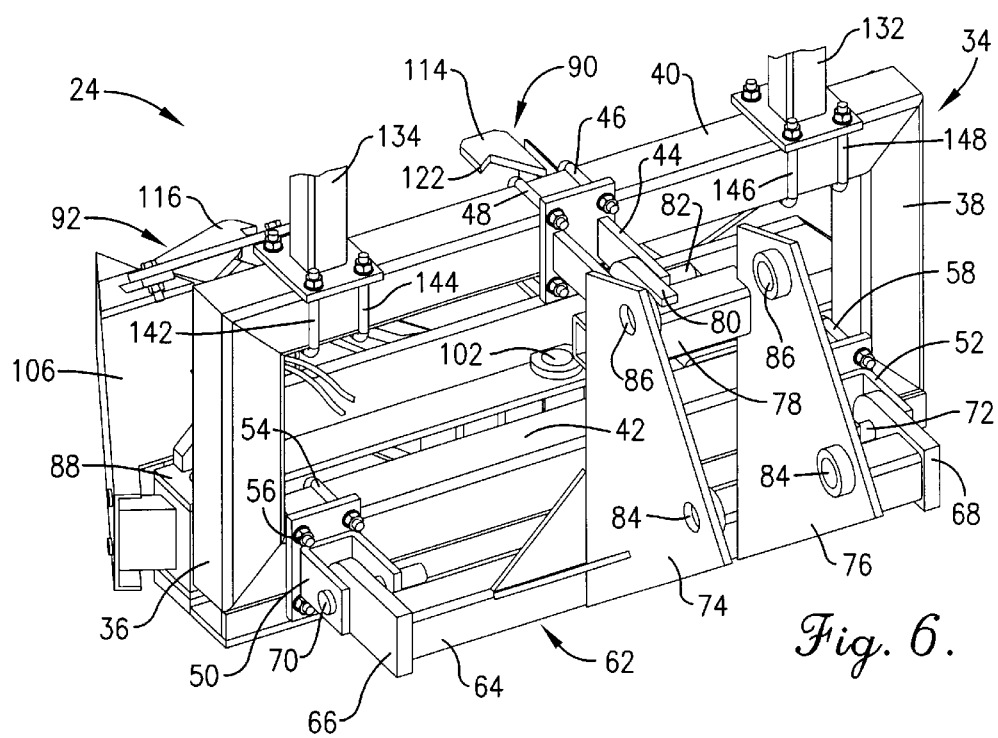
FIG. 6 is a left rear isometric view thereof with the overhead rack fragmentarily shown.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. The terms "left" and "right" as used herein refer to the shear from the vantage of one standing behind the shear and looking forwardly.

With initial reference to FIG. 1, the present invention has particular, but not exclusive, utility in connection with the backhoe boom assembly of a work vehicle. Thus, a work vehicle 10 has a backhoe 12 of well-known design attached to its rear end in the usual way. The boom assembly 14 can be raised and lowered and swivelled from side-to-side relative to vehicle 10 in the conventional manner. Boom assembly 14 is articulated about a transverse pivot 16 and includes an extendable outer boom 18 of telescopic construction, presenting an exterior portion 20 and an interior portion 22. In lieu of a bucket or shovel at the outer end of boom 18, a tree shear attachment 24 in accordance with the present invention is provided.

Shear 24 is pivotally secured to the outer end of boom 18 by a pivot 26, and a power cylinder 28 on boom 18 is operably coupled with shear 24 through linkage 30 to rock the shear 24 about pivot 26 between various angularly adjusted positions as illustrated throughout the figures. It will be appreciated that linkage 30 is pivotally connected to shear 24 via a second transverse pivot 32 and that the anchor end of power cylinder 28 is mounted on the interior portion 22 of boom 18 via a clearance slot (not shown) in the top wall of exterior portion 20 so that cylinder 28 moves with interior portion 22 as it is telescoped into and out of exterior portion 20.

With particular reference now to FIGS. 5–10, it will be seen that the shear attachment 24 includes a base frame broadly denoted by the numeral 34. Frame 34 is a rectangular, upright, open frame structure comprising a pair of upright side members 36 and 38, a horizontal top member 40 interconnecting the upper ends of side members 36,38, and a horizontal bottom member 42 interconnecting the lower ends of upright side members 36 and 38. Secured to the center of top member 40 and projecting rearwardly therefrom on the back side of frame 34 is a top clevis 44 fastened to member 44 by U-bolts 46 and 48. Also projecting rearwardly from frame 34 on its back side are a pair of lower, laterally spaced apart devises 50 and 52, the clevis 50 being fixed to the left end of lower member 42 by a pair of U-bolts 54 and 56, while the clevis 52 is secured to the right end of lower member 42 by a pair of U-bolts 58 and 60. While the devises 44, 50 and 52 could be utilized to couple frame 34 with the three-point hitch of a tractor or other work vehicle, in the referred embodiment adapter an 62 is attached to the devises in order to adapt frame 34 for connection to the outer end of boom 18.

Adapter 62 includes a lower transverse bar 64 extending parallel to bottom member 42 of frame 34 and spaced rearwardly therefrom. At its opposite ends, lower bar 64 has a pair of forwardly projecting lugs 66 and 68 that are connected at their forward ends to respective lower clevises 50 and 52 by corresponding transverse pins 70 and 72. A pair of upright, laterally spaced apart, fore-and-aft, generally triangular mounting plates 74 and 76 are rigidly affixed to lower bar 64 generally centrally thereof and project up to the level of top clevis 44, where they are disposed in centered relationship with clevis 44 and slightly outboard therefrom in opposite lateral direction. A relatively short upper cross bar 78 rigidly interconnects the two triangular plates 74,76 adjacent their upper ends and has a lug 80 projecting forwardly therefrom. Lug 80, in turn, is received between the laterally spaced members of top clevis 44 and is securely fixed thereto by a transverse pin 82. Due to the three point connection of adapter 62 to the devises 44, 50 and 52, adapter 62 is not swingable up and down relative to frame 34, notwithstanding the pivotal nature of pins 70,72 and 82.

Mounting plates 74 and 76 are provided with a pair of lower, axially aligned mounting holes 84 and a pair of upper axially aligned mounting holes 86. Lower holes 84 are adapted to receive coupling pivot 26 by which the shear is attached to boom assembly 14, while upper holes 86 are adapted to receive coupling pivot 32 by which operating linkage 30 is coupled with shear 24.

On the front side of frame 34 a transverse, horizontal beam 88 is rigidly affixed to bottom member 42 of frame 34 and portions of upright side members 36,38. Beam 88, in turn, supports a pair of forwardly projecting jaws broadly denoted by the numerals 90 and 92, the jaw 90 being stationary and the jaw 92 being moveable toward and away from stationary jaw 90. Stationary jaw 90 is reinforced by a number of structural members including, for example, a horizontally disposed, inwardly angled strap 94 and a downwardly, forwardly and inwardly extending brace 96 that joins stationary jaw 90 with the upper right corner of frame 34. An elongated, fore-and-aft extending anvil 98 runs along the inner edge of stationary jaw 90, effectively defining one side extremity of the mouth 100 defined between jaws 90 and 92 when the same are separated as illustrated, for example, in FIGS. 5 and 9.

Moveable jaw 92 is connected to cross beam 88 via an upright pivot 102. A hydraulic operating cylinder 104 is connected between the outer end of jaw 92 and the left end of beam 88 for effecting swinging movement of jaw 92 toward and away from stationary jaw 90. As illustrated fully in FIGS. 5 and 7 but, only fragmentarily in FIGS. 8 and 9, a generally triangular housing 106 encloses cylinder 104 except for a clearance opening 108 (FIG. 7) through which the rod 110 of cylinder 104 can extend and retract during operation of moveable jaw 92. Although not illustrated, it is to be understood that the bottom of housing 106 is also closed.

Figure 7:
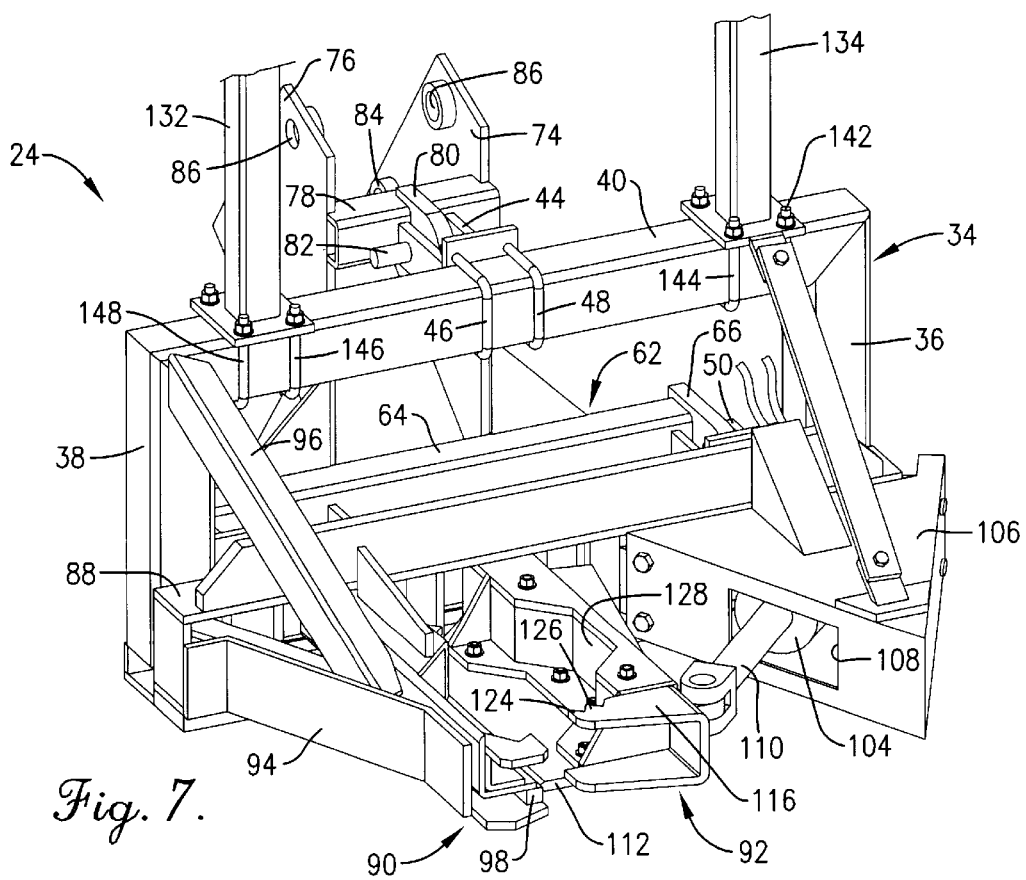
FIG. 7 is a fragmentary right front isometric view of the shear showing the jaws closed.
Figure 8:
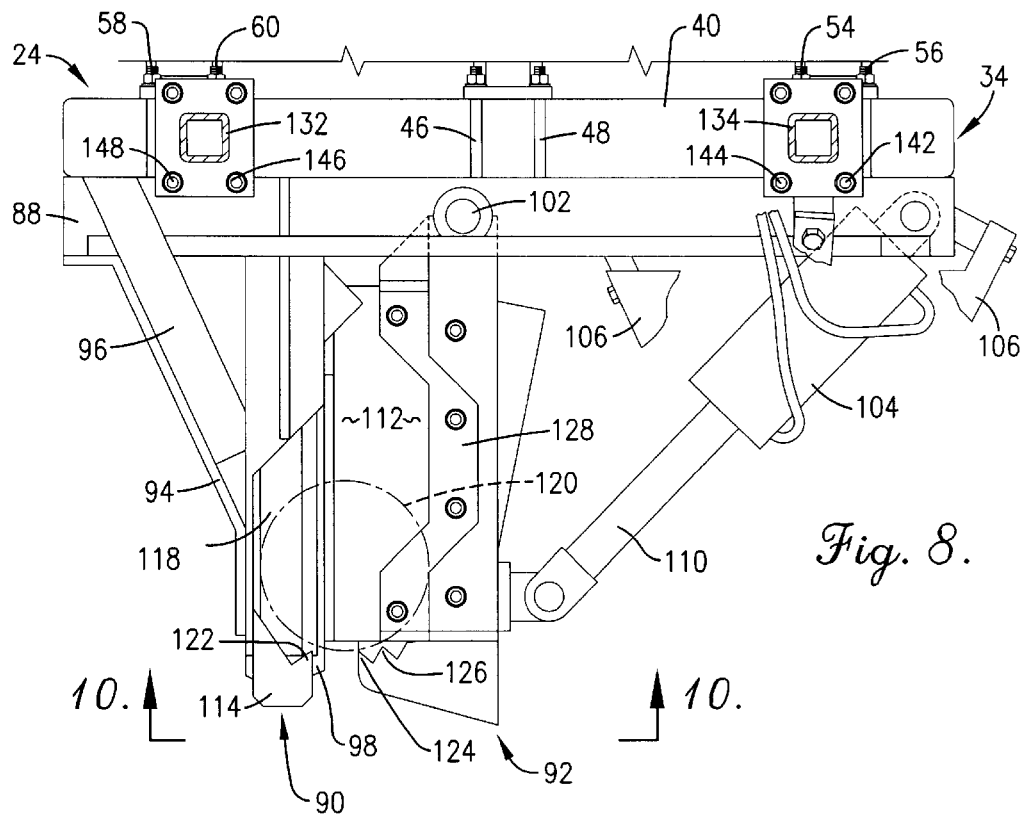
FIG. 8 is a fragmentary top plan view of the shear with the jaws closed and portions of the shear removed to reveal details of construction.
Figure 9:
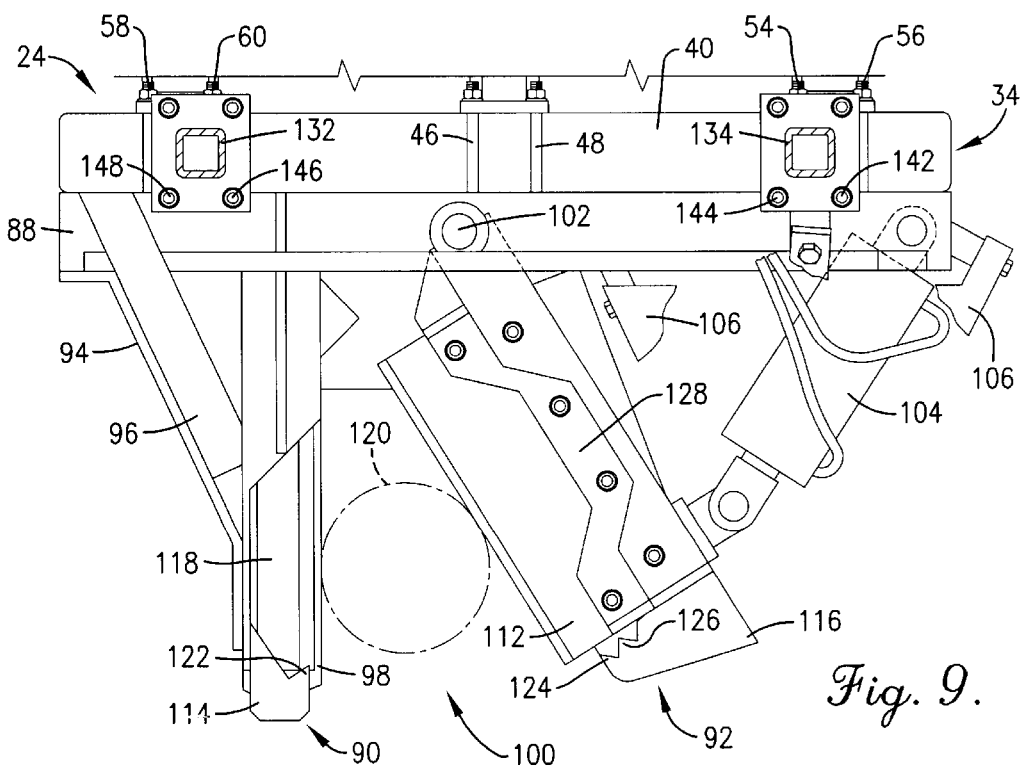
FIG. 9 is a fragmentary top plan view similar to FIG. 8 but showing the jaws open.

Moveable jaw 92 has an elongated, generally fore-and-aft extending rigid blade 112 that cooperates with anvil 98 in shearing the tree. As illustrated in FIGS. 7, 8 and 10, blade 112 is in abutting engagement with anvil 98 when jaws 90 and 92 are fully closed.

The fowardmost ends of jaws 90 and 92 are provided with special retainers for assisting in gripping and stabilizing the lower end of a tree during severance, such retainers being broadly denoted by the numerals 114 and 116 respectively. Retainer 114 on stationary jaw 90 is in the nature of a relatively small, flat horizontally extending plate that is spaced above anvil 98 and projects laterally inwardly generally toward mouth 100 so as to overhang the forwardmost extremity of anvil 98. The top surface of stationary jaw 90 is configured to present one-half of an upwardly opening basin or cavity generally denoted by the numeral 118, it being the function of such cavity 118 to receive a corresponding portion of a tree trunk after severance as illustrated in phantom lines by the numeral 120 in FIG. 8. Retainer 114 closes off the front extremity of cavity half 118 and is provided with a rearwardly projecting tooth 122 for digging into the tree trunk to facilitate gripping thereof when the jaws are closed as illustrated in FIG. 8.

The other retainer 116 on moveable jaw 92 is somewhat similarly constructed, except that in the preferred embodiment, it takes the shape of a generally U-shaped, formed metal member provided with a top laterally inwardly projecting portion that generally overhangs and is spaced above the forwardmost extremity of shear blade 112. Retainer 116 has a pair of sharp teeth 124 and 126 that face rearwardly into an opposite cavity half 128 overlying shear blade 112 and cooperating with the cavity half 118 of stationary jaw 90 to define the upwardly facing cavity for receiving the butt of the tree trunk 120 when jaws 90 and 92 are closed as illustrated in FIG. 8. Teeth 124 and 126 bite into trunk 120 to help retain and stabilize the latter during severance and thereafter.

Supported by frame 34 above the jaws 90 and 92 is an overhead stabilizing rack broadly denoted by the numeral 130. Rack 130 includes a pair of laterally spaced apart uprights 132 and 134, a transverse crosshead 136 interconnecting uprights 132 and 134 at their upper ends, and a pair of forwardly projecting arms 138 and 140 at opposite ends of crosshead 136. Rack 130 is secured to frame 34 via a pair of U-bolts 142 and 144 at the bottom end of upright 132, and a second pair of U-bolts 146 and 148 at the bottom end of upright 134.

As illustrated particularly in FIG. 5, stabilizing arm 138 of rack 130 is inturned at its outer end so as to present an exterior elbow 150 at the intersection of an angularly outwardly projecting inner section 152 of arm 138 and an angularly inwardly projecting outer section 154 of such arm. Such angular intersection renders the arm 138 generally concave along its laterally inward extremity to present a receiving nook 156 that is on the opposite side of arm of 138 from elbow 150. Nook 156 generally overlies stationary jaw 90 in generally vertical registration therewith while being disposed in opposing relationship to moveable jaw 92.

The other arm 140 of rack 130 comprises a straight section 158 projecting outwardly from crosshead 136 at substantially right angles therewith. Arm 140 is shorter than arm 138 and is disposed generally in vertical alignment with moveable jaw 92. At the forwardmost end of arm 140, a projection 160 extends laterally inwardly toward opposite arm 138 and serves to help engage and retain the upper portions of a tree trunk or limbs following severance by jaws 90,92.

OPERATION

The operation and use of shear 24 is depicted primarily in FIGS. 1–4. In those figures it will be seen that the horizontal plane within which jaws 90 and 92 lie is offset below the plane in which the pivot 26 for shear 24 is located. Thus, as will be appreciated, standing trees can be cut off very close to the ground because jaws 90,92 can be laid down at a substantially horizontal angle even though the angle of boom 18 may be inclined downwardly or upwardly. Manipulation of power cylinder 28 causes shear 24 to rock about axis 26 into any one of a number of selectable positions as may be required by the particular situation at hand.

It is often times appropriate to trim one or more limbs from a tree before actually working on the main trunk. Such situation as illustrated in FIG. 1 in which it will be seen that shear 24 is rocked back about axis 26 into an extremely rearwardly inclined attitude. By slipping the open jaws up along opposite sides of the limb and then operating moveable jaw 92 with operating cylinder 104, the limb is effectively sheared from the trunk while rack 130 helps cradle the outer end of the severed limb. The severed limb may then be carried over to a discharge point and dropped from shear 24 by appropriately operating cylinder 28 to invert shear 24, or at least cock it forwardly far enough to release the limb. Thereafter, as illustrated in FIG. 2, shear 24 may be oriented in a generally upright condition with the jaws on opposite sides of the main trunk and the upper portions of the trunk confined between arms 138 and 140 of stabilizing rack 130. Once again, operating moveable jaw 92 to bring blade 112 into contacting engagement with stationary anvil 98 will result in the upper portion of the tree being severed from the lower section thereof. As such severance occurs, the upper severed portion of the trunk is forced into receiving nook 156 of arm 138, while the retainers 114 and 116 on the front ends of the jaws dig into and grip the lower butt end of the severed trunk portion. Consequently, as shown in FIG. 3, jaws 90, 92 and rack 130 thereafter control the severed portion, which may then be discharged as illustrated in FIG. 4 and severed into shorter lengths if desired.

It will be appreciated that the design of shear 24 and its provision for coupling with the forward end of the backhoe 12 provides a high degree of maneuverability for the shear with a very broad and extensive range of motion. Not only can the shear be tipped back and forth into the appropriate attitude, but also the backhoe can be swung horizontally into the appropriate position, it can be articulated up and down, and the outer end of the boom can be telescoped in and out to provide extra reach when necessary. This flexibility is a tremendous asset in coping with the challenges that frequently confront an operator when trimming roadside brush and trees, for example.

Moreover, having one of the jaws function as a stationary rigid anvil while the other jaw moves toward it provides a degree of strength and reliability not present in many prior units where both jaws are moveable in a scissor-like action. This construction, coupled with the special retaining teeth at the front ends of the jaws, greatly facilitates handling and control of the tree once it is severed from its means of support and attachment to the ground. Additionally, the unique nature of the overhead stabilizing rack is advantageous in safely and securely controlling the severed tree immediately following such severance and thereafter.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

What is claimed is:

1. Tree shear apparatus comprising:
    a boom assembly including an elongated boom having an outer end;
    a frame pivotally attached to said outer end of the boom for pivoting movement relative to the boom about a transverse horizontal axis; and
    a pair of jaws mounted on said frame and projecting forwardly therefrom,
    at least one of said jaws being adapted for powered movement toward and away from the other jaw in a shearing action,
    said boom assembly further including a power cylinder operably coupled with said frame in a manner to permit the jaws to be rocked by the cylinder about said transverse axis into any selected one of a number of angularly adjusted positions,
    said other jaw comprising a fixed jaw that includes a generally fore-and-aft extending anvil,
    said one jaw including a shear blade movable into engagement with the anvil for carrying out the shearing action,
    said jaws having a pair of toothed retainers located above the level of said anvil and said blade,
    said retainers being disposed at the forward ends of said jaws and projecting laterally inwardly toward one another,
    each of said retainers including at least one rearwardly facing tooth disposed to assist in gripping and retaining the butt of a tree severed by the jaws.

2. Tree shear apparatus as claimed in claim 1,
    said boom being extendable and retractable.

3. Tree shear apparatus as claimed in claim 2,
    said boom assembly further including a second elongated boom pivotally coupled with the first-mentioned boom remote from said outer end to render the boom assembly articulated about a second transverse axis,
    said boom assembly further including a second power cylinder operably interconnecting said booms for effecting articulation about said second axis.

4. Tree shear apparatus as claimed in claim 3,
    said boom assembly being adapted for mounting on a mobile vehicle.

5. Tree shear apparatus as claimed in claim 1,
    said boom assembly further including a second elongated boom pivotally coupled with the first-mentioned boom remote from said outer end to render the boom assembly articulated about a second transverse axis, said boom assembly further including a second power cylinder operably interconnecting said booms for effecting said articulation.

6. Tree shear apparatus as claimed in claim 1, said boom assembly being adapted for mounting on a mobile vehicle.

7. Tree shear apparatus as claimed in claim 1, said jaws being located and operating in a plane generally parallel to said transverse axis but offset below said transverse axis to facilitate engagement of the jaws with a standing tree close to the ground.

8. Tree shear apparatus as claimed in 1, said frame having an overhead stabilizing arm spaced above said fixed jaw and projecting forwardly from the frame, said arm having a laterally inturned forward portion that presents a receiving nook in the arm generally opposed to said moveable jaw for stabilizing upper sections of a tree being sheared.

9. Tree shear apparatus as claimed in claim 8, said arm comprising part of a stabilizing rack on said frame, said rack further including a second overhead stabilizing arm spaced laterally from the first-mentioned arm and projecting forwardly from the frame generally above said movable jaw.

10. Tree shear apparatus as claimed in claim 9, said second arm having a laterally inwardly extending projection at the outer end thereof.

11. Tree shear apparatus as claimed in claim 10, said frame having an overhead stabilizing arm spaced above said fixed jaw and projecting forwardly from the frame, said arm having a laterally inturned forward portion that presents a receiving nook in the arm generally opposed to said movable jaw for stabilizing upper sections of a tree being sheared.

12. Tree shear apparatus as claimed in claim 11, said arm comprising part of a stabilizing rack on said frame, said rack further including a second overhead stabilizing arm spaced laterally from the first-mentioned arm and projecting forwardly from the frame generally above said movable jaw.

13. Tree shear apparatus as claimed in claim 12, said second arm having a laterally inwardly extending projection at the outer end thereof.

14. Tree shear apparatus as claimed in claim 1, said moveable jaw having an operating cylinder connected between the same and said frame, said frame having a housing projecting forwardly therefrom and enclosing at least a portion of said operating cylinder.

15. A tree shear attachment for a mobile work vehicle comprising:

a frame presenting a front side and a rear side;

mounting structure on the rear side of the frame for detachably securing the frame to a work vehicle; and a pair of jaws mounted on the front side of said frame and projecting forwardly therefrom, one of said jaws being movable and provided with a blade, and the other of said jaws being fixed and provided with an anvil, said one jaw being adapted for powered movement toward and away from the other jaw in a shearing action, said jaws having a pair of toothed retainers located above the level of said anvil and said blade, said retainers being disposed at the forward ends of said jaws and projecting laterally inwardly toward one another, each of said retainers including at least one rearwardly facing tooth disposed to assist in gripping and retaining the butt of a tree severed by the jaws.

16. A tree shear attachment as claimed in claim 15, said frame having an overhead stabilizing arm spaced above said fixed jaw and projecting forwardly from the frame, said arm having a laterally inturned forward portion that presents a receiving nook in the arm generally opposed to said movable jaw for stabilizing upper sections of a tree being sheared.

17. A tree shear attachment as claimed in claim 16, said arm comprising part of a stabilizing rack on said frame, said rack further including a second overhead stabilizing arm spaced laterally from the first-mentioned arm and projecting forwardly from the frame generally above said movable jaw.

18. A tree shear attachment as claimed in claim 17, said second arm having a laterally inwardly extending projection at the outer end thereof.

19. A tree shear attachment for a mobile work vehicle comprising:

a frame presenting a front side and a rear side;

mounting structure on the rear side of the frame for detachably securing the frame to a work vehicle; and a pair of jaws mounted on the front side of said frame and projecting forwardly therefrom, one of said jaws being movable and provided with a blade, and the other of said jaws being fixed and provided with an anvil, said one jaw being adapted for powered movement toward and away from the other jaw in a shearing action, said frame having an overhead stabilizing arm spaced above said fixed jaw and projecting forwardly from the frame, said arm having a laterally inturned forward portion that presents a receiving nook in the arm generally opposed to said movable jaw for stabilizing upper sections of a tree being sheared, said arm comprising part of a stabilizing rack on said frame, said rack further including a second overhead stabilizing arm spaced laterally from the first-mentioned arm and projecting forwardly from the frame generally above said movable jaw.

20. A tree shear attachment as claimed in 19, said second arm having a laterally inwardly extending projection at the outer end thereof.

* * * * *